(12) United States Patent
Frota et al.

(10) Patent No.: US 12,047,186 B2
(45) Date of Patent: Jul. 23, 2024

(54) ARTIFICIAL INTELLIGENCE SUPPORTING CONTENT DELIVERY

(71) Applicant: INTERNATIONAL BUSINESS MACHINES CORPORATION, Armonk, NY (US)

(72) Inventors: Rafaela Frota, Boca Raton, FL (US); John S. Werner, Fishkill, NY (US); Andrew C. M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 17/807,745

(22) Filed: Jun. 20, 2022

(65) Prior Publication Data

US 2023/0412410 A1 Dec. 21, 2023

(51) Int. Cl.
*H04L 51/08* (2022.01)
*H04L 12/18* (2006.01)
*H04L 65/403* (2022.01)

(52) U.S. Cl.
CPC .......... *H04L 12/1818* (2013.01); *H04L 51/08* (2013.01); *H04L 65/403* (2013.01)

(58) Field of Classification Search
CPC .... H04L 12/1818; H04L 51/08; H04L 65/403
See application file for complete search history.

(56) References Cited

U.S. PATENT DOCUMENTS

| 8,359,206 | B2 | 1/2013 | Whalin | |
|---|---|---|---|---|
| 8,904,295 | B2 | 12/2014 | Whalin | |
| 9,461,834 | B2 | 10/2016 | Ferlitsch | |
| 10,002,345 | B2 | 6/2018 | Ganani | |
| 10,510,051 | B2 | 12/2019 | Nelson | |
| 10,691,292 | B2 | 6/2020 | Lu | |
| 10,796,697 | B2 | 10/2020 | Somech | |
| 11,263,593 | B1* | 3/2022 | Shetty | ...................... G06F 40/30 |
| 2011/0231409 | A1* | 9/2011 | Dhara | ................. H04L 12/1818 707/748 |
| 2012/0005278 | A1* | 1/2012 | Muller | ............... G06Q 10/1095 709/224 |

(Continued)

OTHER PUBLICATIONS

Mell et al., "The NIST Definition of Cloud Computing", National Institute of Standards and Technology, Special Publication 800-145, Sep. 2011, 7 pages.

*Primary Examiner* — William G Trost, IV
*Assistant Examiner* — Adam A Cooney
(74) *Attorney, Agent, or Firm* — Anthony M. Pallone

(57) ABSTRACT

According to one embodiment, a method, computer system, and computer program product for gathering relevant digital content. The embodiment may include receiving, from an online meeting scheduler, information within an online meeting invite. The embodiment may include analyzing the information using natural language processing (NLP) and machine learning (ML) techniques. Based on results of the analysis of the received information, the embodiment may include locating additional digital content items of the user which are relevant to the information of the online meeting invite. The embodiment may include outputting, to a user, a top-k listing of the additional digital content items for attachment to the online meeting invite before being sent.

20 Claims, 7 Drawing Sheets

(56) References Cited

U.S. PATENT DOCUMENTS

| | | | |
|---|---|---|---|
| 2016/0125346 A1* | 5/2016 | Krantz | G06F 3/0484 |
| | | | 705/7.41 |
| 2016/0358126 A1* | 12/2016 | Bostick | G06Q 10/1095 |
| 2017/0083590 A1* | 3/2017 | Jagarlamudi | G06Q 10/109 |
| 2017/0126755 A1* | 5/2017 | Singh | H04L 67/06 |
| 2017/0236081 A1* | 8/2017 | Grady Smith | G06Q 10/0637 |
| | | | 705/7.36 |
| 2019/0295041 A1* | 9/2019 | Sim | G06Q 10/1095 |
| 2020/0410453 A1* | 12/2020 | Nalliah | G06F 16/93 |
| 2021/0097502 A1* | 4/2021 | Hilleli | G06N 3/08 |
| 2021/0319049 A1 | 10/2021 | Jagarlamudi | |
| 2022/0284402 A1* | 9/2022 | Vangala | G06Q 10/107 |
| 2022/0353309 A1* | 11/2022 | Grover | H04L 65/4015 |
| 2023/0282218 A1* | 9/2023 | Moynihan | G06F 16/40 |
| | | | 704/235 |
| 2023/0325735 A1* | 10/2023 | Torstensen | G06Q 10/101 |
| | | | 705/7.17 |

\* cited by examiner

ARTIFICIAL INTELLIGENCE SUPPORTING CONTENT DELIVERY

BACKGROUND

The present invention relates generally to the field of computing, and more particularly to web conferencing.

Web conferencing allows for the sharing of web-based content and is often used as an umbrella term for different types of online conferencing and collaborative services utilized by two or more users in different locations to facilitate an online meeting. In general, web conferencing is performed through Internet technologies, particularly through Transmission Control Protocol and the Internet Protocol (TCP/IP) connections. Typically, the users participating in an online meeting may include a host, one or more presenters, and one or more guests. The host may organize the online meeting (e.g., selects a web conference forum, creates a meeting agenda, and creates meeting invites for other participants). A presenter may present a meeting topic, provide relevant materials, and lead a discussion among meeting participants. A presenter may also act as the host of the online meeting. A guest may receive an online meeting invite from the host and/or presenter and contribute to the discussion.

SUMMARY

According to one embodiment, a method, computer system, and computer program product for gathering relevant digital content. The embodiment may include receiving, from an online meeting scheduler, information within an online meeting invite. The embodiment may include analyzing the information using natural language processing (NLP) and machine learning (ML) techniques. Based on results of the analysis of the received information, the embodiment may include locating additional digital content items of the user which are relevant to the information of the online meeting invite. The embodiment may include outputting, to a user, a top-k listing of the additional digital content items for attachment to the online meeting invite before being sent.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
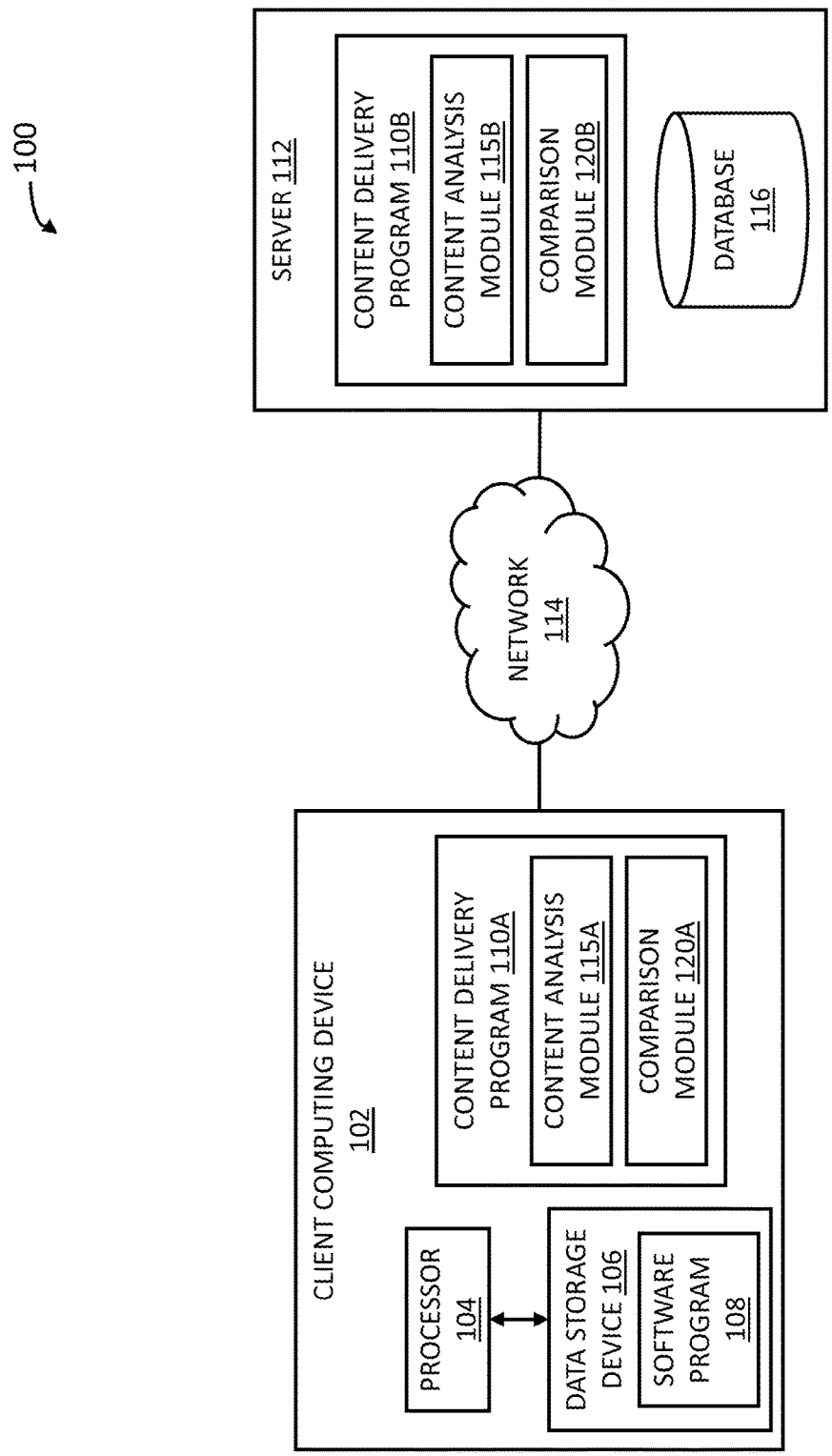
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of computing, and more particularly to web conferencing. The following described exemplary embodiments provide a system, method, and program product to, among other things, present content which is relevant to a topic of an online meeting to a user participating in the online meeting. Therefore, the present embodiment has the capacity to improve the technical field of web conferencing by dynamically distributing information relevant to an online meeting upon creation of a meeting invite and/or upon receipt of a meeting invite.

As previously described, web conferencing allows for the sharing of web-based content and is often used as an umbrella term for different types of online conferencing and collaborative services utilized by two or more users in different locations to facilitate an online meeting. In general, web conferencing is performed through internet technologies, particularly through TCP/IP connections. Typically, the users participating in an online meeting may include a host, one or more presenters, and one or more guests. The host may organize the online meeting (e.g., selects a web conference forum, creates a meeting agenda, and creates meeting invites for other participants). A presenter may present a meeting topic, provide relevant materials, and lead a discussion among meeting participants. A presenter may also act as the host of the online meeting. A guest may receive an online meeting invite from the host and/or presenter and contribute to the discussion.

During the course of an online meeting, reference may be made to content discussed in past email threads. For many users, it may be difficult to remain up to date with information which is the latest and most relevant to a meeting topic at the time of the online meeting as these users may frequently possess a large number of unread emails (e.g., hundreds or even thousands of unread emails). As a result, in preparation for the online meeting, users may perform a search through their emails in order to familiarize themselves with a topic of the meeting or contact the meeting host for relevant meeting material or to resend content. If a user does not see relevant email content prior to the meeting and an unfamiliar topic is discussed during the meeting, those users unfamiliar with the topic may lose focus or create a delay in their attempt to ask questions or seek clarity on the matter. Furthermore, from the perspective of those users creating online meeting invites, it may be difficult to decide which content to share via the meeting invite as it is nearly impossible to know the current status of understanding that meeting attendees have on subject matter (i.e., topic(s)) to be discussed during the meeting. It may therefore be imperative to have a system in place to provide a user-centric, customized artificial intelligence (AI) content delivery service to distribute information (i.e., content) which is relevant to an online meeting. Thus, embodiments of the present invention may be advantageous to, among other things, gather content (e.g., emails, data files) which are relevant to a created or a received online meeting invite, and accordingly, display to the user the gathered content as suggestions to be included in the created meeting invite and/or to be reviewed in preparation for the meeting. The present invention does not require that all advantages need to be incorporated into every embodiment of the invention.

According to at least one embodiment, when a host user is creating an online meeting invite, relevant digital content (e.g., data files) may be gathered and provided to the host user as suggestions to be included in the online meeting invite as attachments. According to at least one other embodiment, for a user who is an online meeting invitee, based on information included within a received online meeting invite, relevant content (e.g., data files) may be gathered and a prioritized list of suggested content may be provided to the invitee user prior to the online meeting. In embodiments of the invention, machine learning (ML), natural language processing (NLP), and data analytics may be used to identify email, documents, and files within a data repository of a user which are relevant to information within an online meeting invite. Eigenvectors, with corresponding eigenvalues, may be calculated for the meeting invite and for every gathered piece of content. Eigenvectors and eigenvalues for gathered digital content may be compared with an eigenvector and eigenvalue of the meeting invite to identify top matching content as suggestions to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify data files of a user which are relevant to information within an online meeting invite and, accordingly, provide the user with top-k identified data files as suggestions for attachment, review, or both.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and the server 112 may each individually host a content delivery (CD) program 110A, 110B, respectively. In one or more other embodiments, the CD program 110A, 110B may be partially hosted on client computing device 102 and server 112 so that functionality may be separated among the devices.

The communication network 114 may include various types of communication networks, such as a personal area network (PAN), wide area network (WAN), local area network (LAN), a telecommunication network, a wireless network, a wireless ad hoc network (i.e., a wireless mesh network), a public switched network, and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a CD program 110A and communicate with the server 112 via the communication network 114, in accordance with embodiments of the invention. Client computing device 102 may be, for example, a mobile device, a smartphone, a personal digital assistant, a netbook, a laptop computer, a tablet computer, a desktop computer, or any type of computing device capable of running a program and accessing a network. The software program 108 may be a program which provides email and electronic calendar services. For example, the software program 108 may allow a user to send and receive online meeting invites, and allow the user to view, send, and receive digital content (e.g., emails). Furthermore, the data storage device 106 may include a database, accessible by the software program 108 and the CD program 110A, storing digital content (e.g., online meeting invites, emails, data files) of a user as well as a profile defining, at least, email and calendar preferences of the user. As will be discussed with reference to FIG. 5, the client computing device 102 may include internal components 402a and external components 404a, respectively.

In one or more other embodiments, the software program 108 may not be limited to a program which provides email and electronic calendar services. In such embodiments, the software program 108 may include, for example, a messaging/chat program or other communication platform, or a local or cloud-based file hosting service utilized by the user, and digital content items may include meeting transcripts or data files of the user. Moreover, the software program 108 may access a database (e.g., data storage device 106, database 116) storing a profile and associated digital content of the user and may allow the user to view their digital content.

The server computer 112 may be a laptop computer, netbook computer, personal computer (PC), a desktop computer, server, or any programmable electronic device or any network of programmable electronic devices capable of hosting and running a CD program 110B and a database 116 and communicating with the client computing device 102 via the communication network 114, in accordance with embodiments of the invention. The database 116 may store digital content (e.g., emails, data files) of a user as well as a profile defining, at least, email and calendar preferences of the user. As will be discussed with reference to FIG. 5, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the CD program 110A, 110B may include content analysis module 115A, 115B and comparison module 120A, 120B, respectively, and may be a program capable of receiving digital content items (e.g., online meeting invites, emails, data files) of a user as input from another software application (e.g., software program 108), analyzing information within received digital content items utilizing ML analytics and NLP, calculating eigenvectors and corresponding eigenvalues for received digital content items, weighting and comparing eigenvectors and eigenvalues of digital content items, assessing a similarity between an eigenvectors and eigenvalue of an online meeting invite digital content item and eigenvectors and eigenvalues of other digital content items (e.g., emails, data files), presenting to the user a list of top-k other digital content items which are similar to the online meeting invite digital content item, attaching user selected top-k similar digital content items (e.g., emails, data files) to an online meeting invite, and receiving feedback concerning top-k digital content item selections by the user. In at least one other embodiment, the CD program 110A, 110B may be incorporated as a plug-in to another software application (e.g., software program 108 providing email and calendar services). In at least one embodiment, the CD program 110A, 110B may require a user to opt-in to system usage upon opening or installation of the CD program 110A, 110B. The content delivery method is explained in further detail below with respect to FIG. 2, FIG. 3, and FIG. 4.

Figure 2:
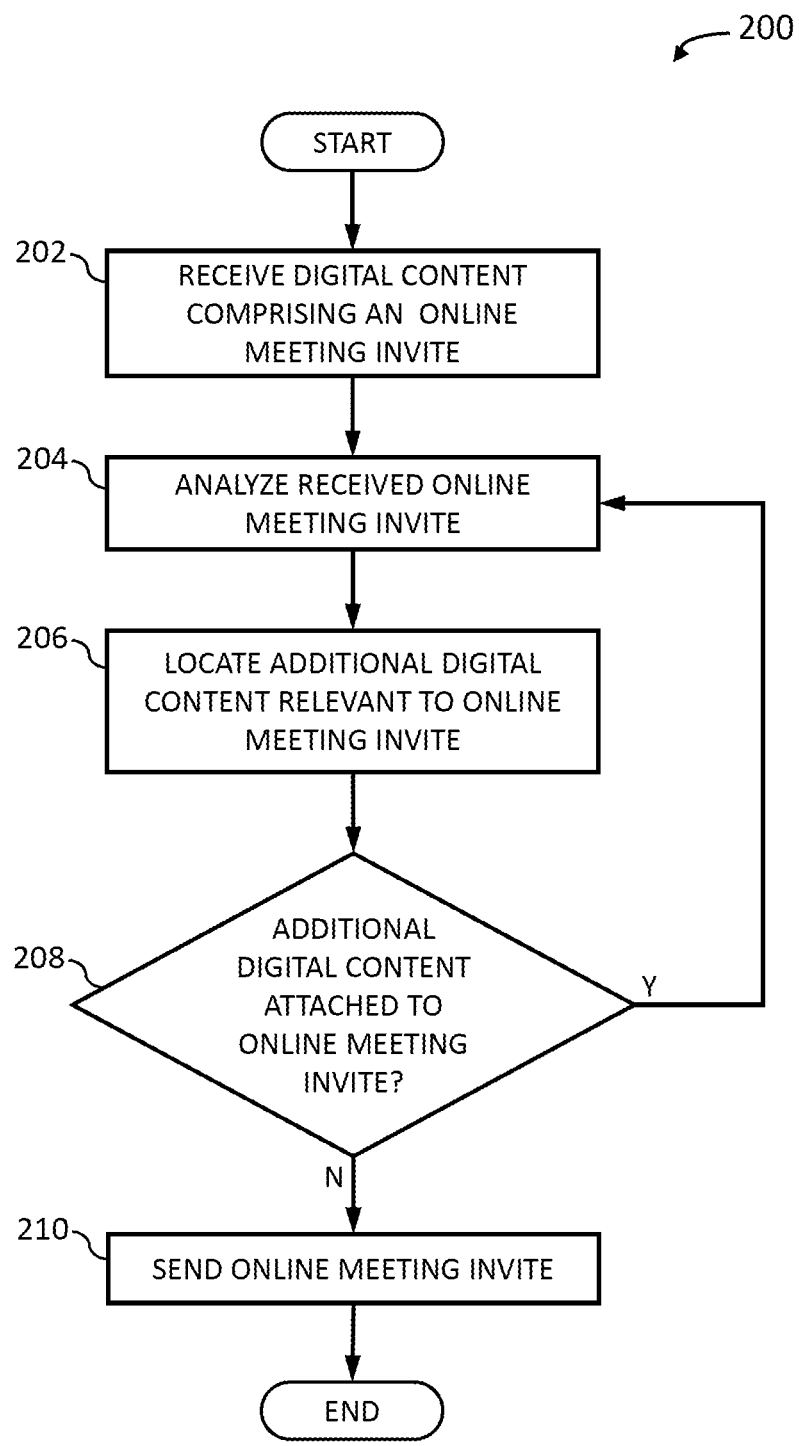
FIG. 2 illustrates an operational flowchart for providing digital content which is relevant to an online meeting invite in an online meeting content delivery process according to at least one embodiment.

Referring now to FIG. 2, an operational flowchart for providing digital content which is relevant to an online meeting invite in an online meeting content delivery process 200 is depicted according to at least one embodiment. At 202, the CD program 110A, 110B receives a digital content item of a user in the form of an online meeting invite. The meeting invite may be created by the user utilizing another application (e.g., software program 108) and sent in real-time as input to the CD program 110A, 110B. In another embodiment where the CD program 110A, 110B may be integrated within another program, the CD program 110A, 110B may evaluate digital content items (e.g., online meeting invites, emails, data files) of the user created or received, in real-time, within the other program. According to at least one embodiment, the received meeting invite created by the user may include information such as a meeting title, a sender, one or more invitees/recipients, an agenda, notes, and one or more attachments (e.g., email, presentation, spreadsheet, link, text document).

Next, at 204, the CD program 110A, 110B analyzes the received online meeting invite. In analyzing the meeting invite, the CD program 110A, 110B may utilize the content analysis module 115A, 115B to evaluate information (e.g., meeting title, sender, one or more invitees/recipients, agenda, notes, one or more attachments) populated within the meeting invite. Analysis of the received online meeting invite and CD program 110A, 110B directed actions of the content analysis module 115A, 115B are explained in further detail below with respect to FIG. 3.

At 206, the CD program 110A, 110B locates additional digital content items of the user which are identified as being relevant to the online meeting invite and which the user may include within the online meeting invite. In locating the additional digital content items, the CD program 110A, 110B may access/search a digital content repository of the user (e.g., data storage device 106, database 116), and may utilize the comparison module 120A, 120B. Identification of relevant additional digital content items and CD program 110A, 110B directed actions of the comparison module 120A, 120B are explained in further detail below with respect to FIG. 4.

Next, at 208, the CD program 110A, 110B determines whether any suggested additional digital content items which were identified as being relevant to the online meeting invite were attached to the meeting invite by the user. According to at least one embodiment, any suggested additional digital content items attached by the user may be one or more of suggested digital content items included in a listing of top-k digital content items of the user with a similarity to the online meeting invite and output to the user as described below with respect to step 710 of FIG. 4. In response to determining that the user has attached at least one suggested additional content item to the online meeting invite (step 208, "Y" branch), the online meeting content delivery process 200 may return to step 204 and re-analyze the received online meeting invite with the attached additional digital content item(s). It should be noted that during the re-analysis of the online meeting invite with attached additional content, the CD program 110A, 110B may update an eigenvector and corresponding eigenvalue of the meeting invite as described below with respect to FIG. 3. According to at least one embodiment, the CD program 110A, 110B may perform only one additional iteration to re-analyze an augmented online meeting invite. According to at least one other embodiment, the CD program 110A, 110B may perform multiple iterations to re-analyze an augmented online meeting invite until the user does not attach any suggested additional digital content items or until the suggested additional digital content items are the same on consecutive iterations. In response to determining that the user has not attached at least one suggested additional content item to the online meeting invite (step 208, "N" branch), the online meeting content delivery process 200 may proceed to step 210.

At 210, the CD program 110A, 110B sends the online meeting invite to intended recipients (i.e., the meeting invitees). According to at least one embodiment, the sent online meeting invite may include any suggested additional digital content items that were attached to the meeting invite by the user. Additionally, the sent online meeting invite may also include a created/updated eigenvector and corresponding eigenvalue for the invite, as described below with respect to FIG. 3, within metadata of the online meeting invite.

Figure 3:
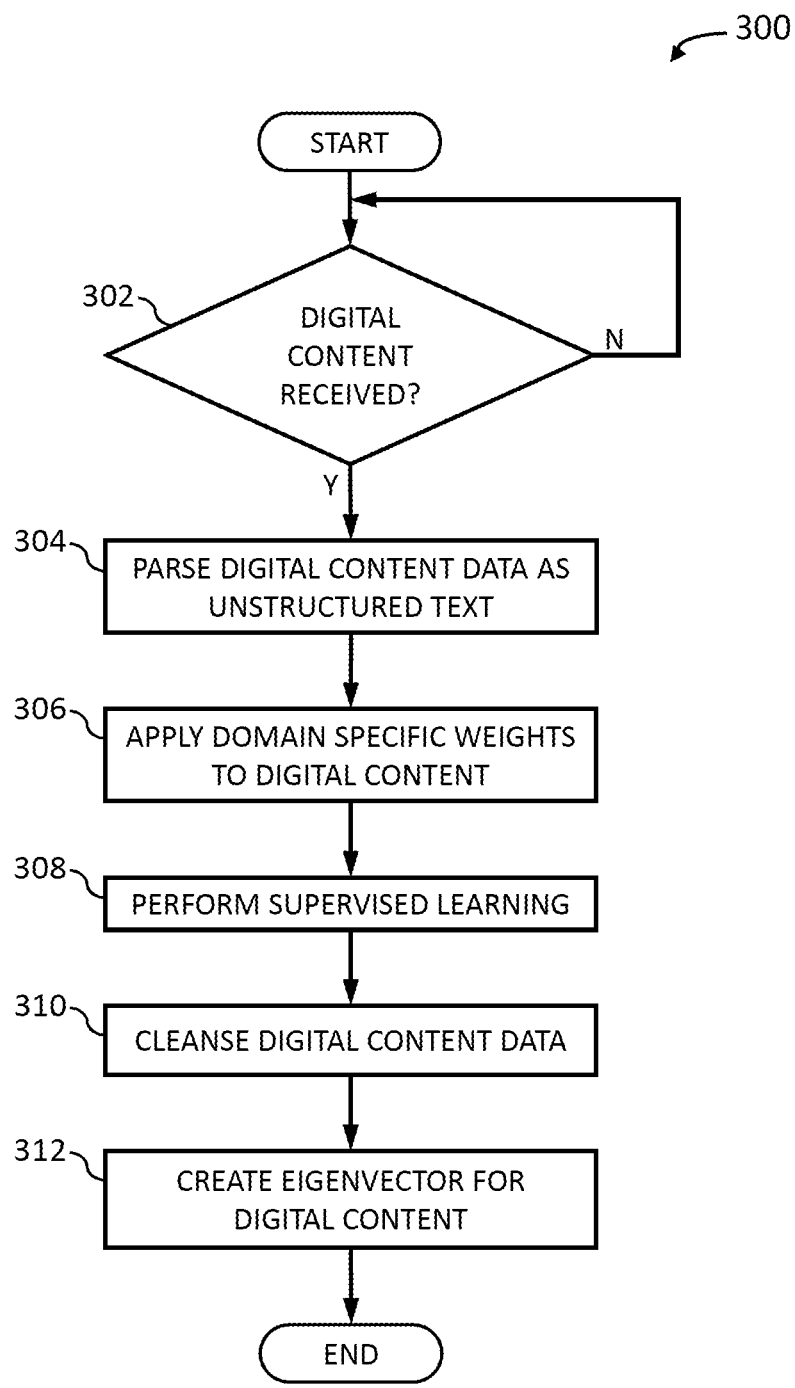
FIG. 3 illustrates an operational flowchart for analyzing received digital content in a digital content analysis process according to at least one embodiment.

Referring now to FIG. 3, an operational flowchart for analyzing received digital content in a digital content analysis process 300 is depicted according to at least one embodiment. At 302, the CD program 110A, 110B determines whether a digital content item (e.g., online meeting invite, email, data file) has been received. According to at least one embodiment, the digital content item may be the online meeting invite created by the user and received by CD program 110A, 110B in step 202 of FIG. 2. In one or more other embodiments, the digital content may be a received email, a message of a messaging/chat program (e.g., software program 108), a speech-to-text transcript of a meeting, phone call, or video or audio file, a data file from a file hosing service, and/or a text message. In response to determining that a digital content item has not been received (step 302, "N" branch), the digital content analysis process 300 may begin anew and wait for a digital content item to be received. In response to determining that a digital content item has been received (step 302, "Y" branch), the digital content analysis process 300 may proceed to step 304 to parse the received digital content data item as unstructured text.

Next, at 304, in response to receiving a digital content item, the CD program 110A, 110B applies NLP techniques to parse information within the received digital content item as unstructured text. According to at least one embodiment, NLP is applied to parse information populated within the meeting invite (e.g., meeting title, one or more invitees, agenda, notes, one or more attachments) as unstructured text. Application programming interfaces (APIs) may be utilized by the CD program 110A, 110B to extract text from any attachments within the meeting invite.

At 306, the CD program 110A, 110B applies weights to the unstructured text of the received digital content item based on domain specific policies/materials. According to at least one embodiment, weights are applied to information within the unstructured text of the received online meeting invite. Domain specific weighting policies/materials may be defined by the user and stored within the data storage device 106 or the database 116 and may be accessible by the CD program 110A, 110B. The CD program 110A, 110B may utilize NLP techniques to apply weight adjustments based on domain specific criteria including, but not limited to, occurrence of a token, a correlation between a group of tokens, a correlation between a token or group of tokens and a job role of a sender, recipient, or invitee which may be extracted from a company directory or a professional social networking website, a correlation between a sender, recipient, or invitee and an attachment (e.g., a higher weight may be applied if the invitee authored the attachment), a correlation between a sender, recipient, or invitee and a link to a shared folder or messaging channel (e.g., the sender, recipient, or invitee has access to the provided link), or unread emails. Further examples of weight adjustments may include excluding analysis of an attachment which is unfamiliar or corrupt, prioritizing known attachment types, prioritizing meeting content and agenda, and down-weighting meeting invites which are new to meetings that include attached content.

Through the application of the domain specific weight adjustments, inductive bias is utilized by the CD program 110A, 110B when later performing supervised learning to make predictions. The inductive bias (also known as learning bias) of a learning algorithm (i.e., CD program 110A, 110B) is the set of assumptions, which may be initially defined by the user, that the algorithm uses to better predict outputs of given inputs that it has not encountered. The learning algorithm may learn from these assumptions to make adjustments in the future such that unfamiliar content becomes familiar over time and the weighting is adjusted accordingly. Moreover, these assumptions may enable the learning algorithm to find the function that can map the given inputs to the outputs and to optimize the function in order to make accurate predictions. Also, using hyperparameter optimization, different functions may be selected by the CD program 110A, 110B based on the nature of the online meeting invite. For example, a soft cosine function may be selected if the meeting is specific to a single topic, or a cosine function may be selected if the meeting relates to multiple topics.

Next, at 308, the CD program 110A, 110B performs supervised learning using the weighted information from step 306 to make predictions of additionally relevant digital content items related to the digital content item received at 302 (or the digital content comprising the online meeting invite at 202). Adjusting the weights at 306 allows the CD program 110A, 110B to prioritize digital content which is familiar and consequently allow for better (i.e., more accurate) predictions.

At 310, the CD program 110A, 110B cleanses data of the digital content item. According to at least one embodiment, the CD program 110A, 110B may utilize NLP techniques to cleanse data of the online meeting invite. The utilized NLP techniques may include stemming, synonym analysis, word2vec, and cosine, k-means, and/or the Jaccard index. In at least one or more other embodiments, the data cleansing may occur prior to step 304, or the data cleansing may occur both prior to step 304 and again at step 310.

Next, at 312, the CD program 110A, 110B creates an eigenvector for the received digital content item. According to at least one embodiment, an eigenvector, along with a corresponding eigenvalue, may be calculated (or updated when the online meeting content delivery process 200 of FIG. 2 is looping through another iteration resulting from added content) for the online meeting invite based on a plurality of dimensions/attributes and individual weights of the information contained therein. The eigenvector may be a unit vector consisting of a series of scores for a plurality of the different dimensions/attributes of a digital content item. Eigenvectors for digital content items may be graphed and used for later comparison of the digital content items by the CD program 110A, 110B. The eigenvalue may be a scaling factor for a respective eigenvector; it may score a respective eigenvector and indicate how far that eigenvector extends in a given direction on the graph. According to at least one embodiment, a calculated eigenvector, along with its corresponding eigenvalue, may be stored within metadata associated with a digital content item (e.g., online meeting invite, email, data file).

According to at least one embodiment, the digital content analysis process 300 may run continuously as a background process and analyze digital content items (e.g., online meeting invites, emails, data files) of the user as they are created and/or received in real-time. According to at least one other embodiment, the digital content analysis process 300 may run at a prescheduled time. For example, the digital content analysis process 300 may execute once per day at a time of low (e.g., off peak) email and electronic calendar service (e.g., software program 108) utilization, low messaging/chat program or other communication platform utilization, or low local or cloud-based file hosting service utilization. According to at least one further embodiment, execution of the digital content analysis process 300 may be triggered by an interrupt or may be a result of a direct function call.

Figure 4:
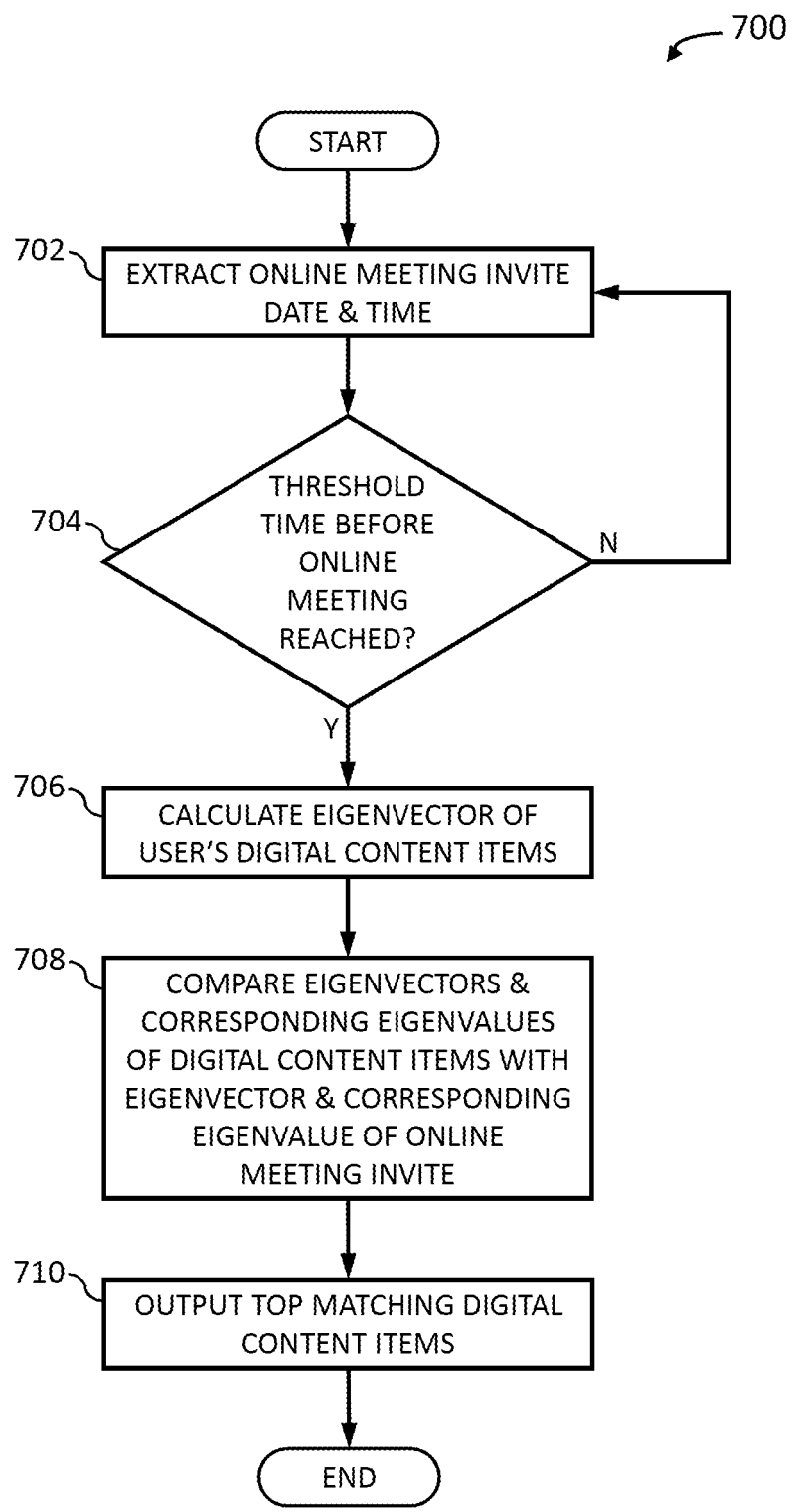
FIG. 4 illustrates an operational flowchart for locating relevant digital content in an additional digital content location process according to at least one embodiment.

Referring now to FIG. 4, an operational flowchart for locating relevant digital content in an additional digital content location process 700 is depicted according to at least one embodiment. The CD program 110A, 110B, may execute this process to compare digital content items of the user and determine their similarity (e.g., similarity between an online meeting invite and emails of the user). At 702, the CD program 110A, 110B extracts, from the online meeting invite created by the user and received by CD program 110A, 110B in step 202 of FIG. 2, a date and a time of the online meeting. The CD program 110A, 110B may also extract dates and times for all meetings entered on the user's electronic calendar service (e.g., software program 108).

Next, at 704, the CD program 110A, 110B determines whether a threshold time before one or more meetings has been reached. The threshold time before a meeting may be a system defined default time or it may be defined by the user (e.g., 1 day before an online meeting, 2 hours before an online meeting). In making this determination, the CD program 110A, 110B may evaluate online meeting date(s) and time(s) extracted at 702 against the defined threshold time. In response to determining that a threshold time before one or more meetings has not been reached (step 704, "N" branch), the additional digital content location process 700 may return to step 702 and wait until a threshold time before one or more meetings has been reached. In response to determining that a threshold time before one or more meetings has been reached (step 704, "Y" branch), the additional digital content location process 700 may proceed to step 706. According to at least one other embodiment, multiple threshold times before an online meeting may exist (e.g., 1 week before a meeting and 1 day before the meeting). According to at least one further embodiment, when executing the additional digital content location process 700, the CD program 110A, 110B may not perform step 704, rather, the additional digital content location process 700 may be executed upon receipt of a new online meeting invite by the CD program 110A, 110B.

At 706, in response to determining that a threshold time before one or more meetings has been reached, the CD program 110A, 110B calculates eigenvectors of the user's digital content items and calculates respective eigenvalues. The CD program 110A, 110B may access eigenvectors stored within the respective metadata of the user's digital content items (these may be the eigenvectors created as a result of the execution of the digital content analysis process 300 when respective digital content items of the user were received by the CD program 110A, 110B). In one or more embodiments of the invention, the digital content analysis process 300 may be executed on a user's digital content as a sub-routine that is called during the execution of the additional digital content location process 700.

Next, at 708, the CD program 110A, 110B compares each of the calculated eigenvectors and corresponding eigenvalues of the user's digital content items with the calculated eigenvector and eigenvalue of the online meeting invite (each calculated at step 312 of the digital content analysis process 300). According to at least one embodiment, the comparison may be performed across the plurality of the different dimensions/attributes (i.e., the series of scores) of the eigenvectors in order to determine their similarity (e.g., correlation between an online meeting invite and emails of the user). The compared dimensions/attributes of the eigenvectors may be defined according to domain specific knowledge of the user. According to at least one embodiment, the CD program 110A, 110B may calculate a match index for comparison of digital content items as they relate to the online meeting invite created by the user and received in step 202 of FIG. 2. According to at least one other embodiment, the CD program 110A, 110B may also compare angles between graphed eigenvectors.

At 710, the CD program 110A, 110B outputs a listing of the top-k (e.g., top 5 or top 3) digital content items of the user having a similarity to the online meeting invite which meets or exceeds a threshold value. According to at least one embodiment, the similarity may be based on a level of matching between an eigenvector and corresponding eigenvalue of a digital content item of the user (e.g., an email) and the eigenvector and corresponding eigenvalue of the online meeting invite when compared at step 708. A level of matching between an eigenvector and corresponding eigenvalue of a digital content item of the user and the eigenvector and corresponding eigenvalue of the online meeting invite may correlate to a level of relevance of the digital content item to the online meeting invite (e.g., a greater level of similarity/match may correlate to a greater level of relevance). According to at least one embodiment, the CD program 110A, 110B may display the output list to the user when creating an online meeting invite and allow the user to attach one or more of the displayed digital content items to the meeting invite. Moreover, additional data (i.e., relevant digital content items) within the meeting invite may enable better matches on the recipient's side prior to the meeting.

According to at least one other embodiment, the CD program 110A, 110B may display an output list to a user prior to an online meeting and allow the user to review one or more of the displayed digital content items in advance. Thereby increasing user preparedness for the meeting and reducing time spent by the user during the meeting to familiarize themselves with relevant content. According to at least one further embodiment, the CD program 110A, 110B may display an output list to a user during an online meeting and facilitate quick identification of relevant digital content the user may wish to share with other meeting attendees. It should be noted that there may be different matches of digital content items displayed to a user who is sending/creating an online meeting invite and a user who is a recipient of the online meeting invite due to each user having access to different digital content items. For example, the sender of a meeting invite may have an email chain and a file on their device that a recipient does not have access to. Likewise, the recipient may have a different email chain and lab test data that correlate to the meeting that the sender of the invite does not have access to. Both users may want those items brought to their attention prior to a meeting such that they can recall them faster or even bring them up during a meeting. The CD program 110A, 110B may avoid privacy concerns by displaying to each respective user only those digital content items which they have access to (e.g., emails on which they have been copied, data files which they are permitted to view) and not digital content items of another user.

In at least one embodiment, the CD program 110A, 110B may optionally extract user feedback (e.g., using analytics such as click counts or by querying the user) concerning the output listing of the top-k digital content items of the user having a similarity/relevance to the online meeting invite. Such user feedback may be utilized for further hyperparameter tuning by the CD program 110A, 110B when performing supervised learning during future execution of the digital content analysis process 300.

It may be appreciated that FIG. 2, FIG. 3, and FIG. 4 provide only an illustration of one implementation and does not imply any limitations with regard to how different embodiments may be implemented. Many modifications to the depicted environments may be made based on design and implementation requirements.

Figure 5:
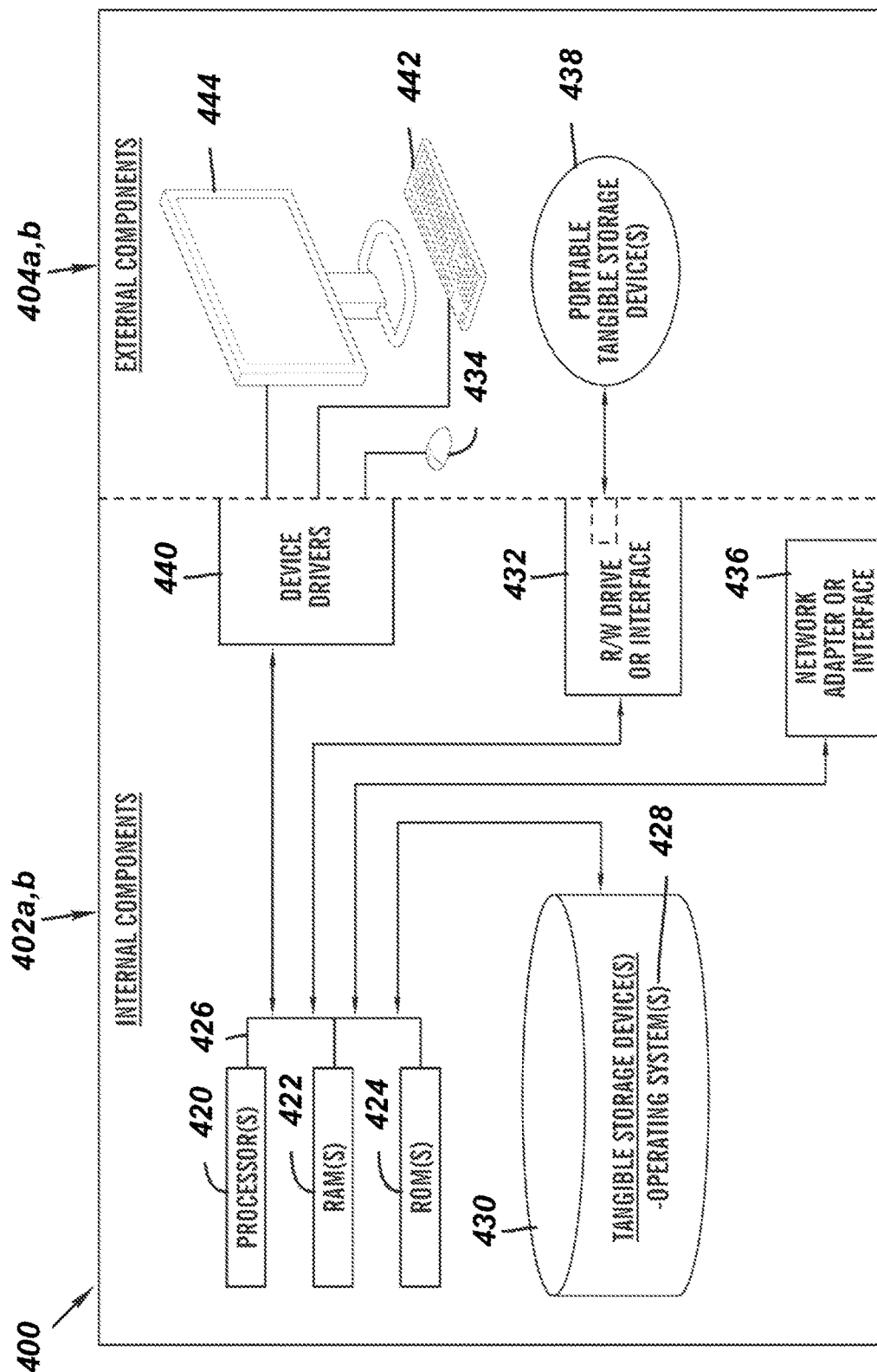
FIG. 5 is a functional block diagram of internal and external components of computers and servers depicted in FIG. 1 according to at least one embodiment.

FIG. 5 is a block diagram 400 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, edge devices, and distributed cloud computing environments that include any of the above systems or devices.

The client computing device 102 and the server 112 may include respective sets of internal components 402 *a,b* and external components 404 *a,b* illustrated in FIG. 5. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the CD program 110A in the client computing device 102 and the CD program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 5, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the CD program 110A, 110B can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, wireless Bluetooth® interface cards, or 3G, 4G, or 5G wireless interface cards or other wired or wireless communication links. The software program 108 and the CD program 110A in the client computing device 102 and the CD program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the CD program 110A in the client computing device 102 and the CD program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
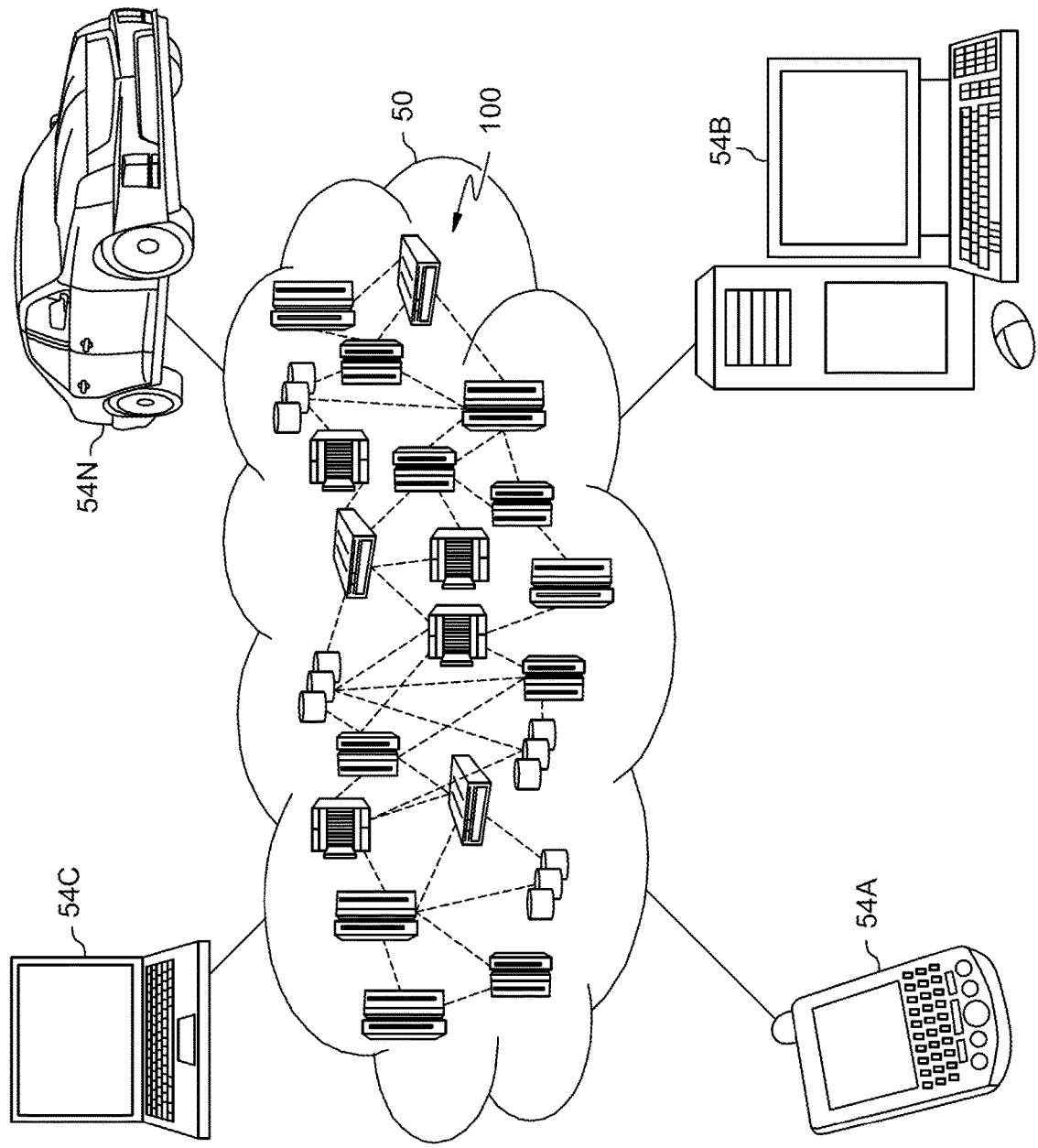
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
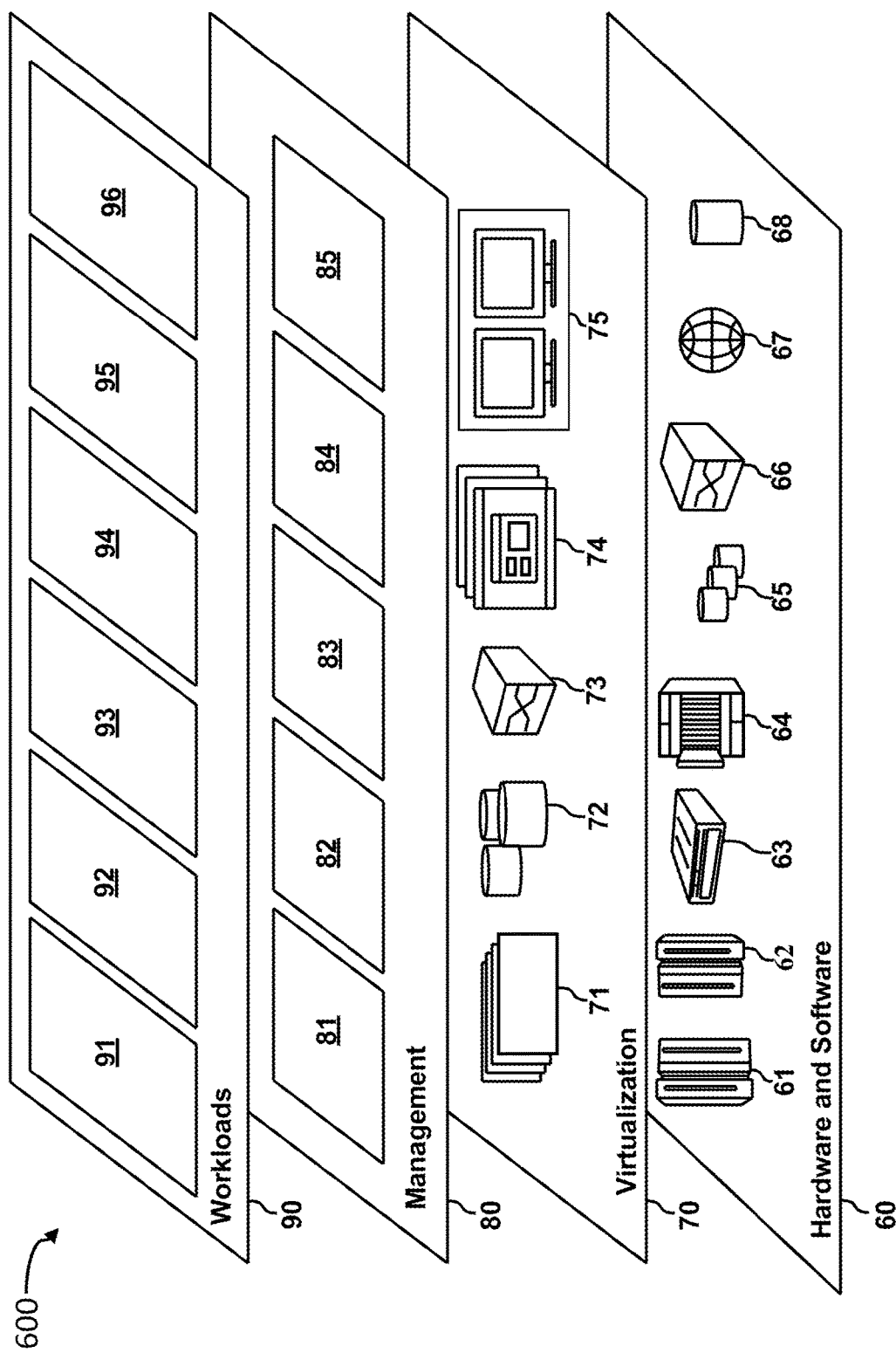
FIG. 7 depicts abstraction model layers according to an embodiment of the present invention.

Referring now to FIG. 7, a set of functional abstraction layers 600 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content delivery 96. Content delivery 96 may relate to displaying suggested additional digital content items which are identified as being relevant to an online meeting invite.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
receiving, from an online meeting scheduler, information within an online meeting invite;
analyzing the information using natural language processing (NLP) and machine learning (ML) techniques, wherein the information comprises a meeting time;
based on results of the analysis of the received information and in response to having reached a threshold time before the meeting time, locating additional digital content items of the user which are relevant to the information of the online meeting invite;
outputting, to a user, a top-k listing of the additional digital content items for attachment to the online meeting invite before being sent;
attaching, to the online meeting invite, a digital content item selected by the user from the top-k listing, wherein the attaching augments the information of the online meeting invite; and
iteratively performing the analyzing, the locating, and the outputting until the top-k listing is the same on consecutive iterations and the user does not select any additional content items of the top-k listing for attachment.

2. The method of claim 1, further comprising:
outputting, to the user, a top-k listing of the additional digital content items for review prior to the meeting time of the online meeting invite.

3. The method of claim 1, wherein analyzing the information using NLP and ML techniques further comprises:
parsing the information as unstructured text;
applying domain specific weights to the parsed information;
performing supervised learning using the weighted parsed information; and
creating an eigenvector and a corresponding eigenvalue for the online meeting invite based on output from the performed supervised learning.

4. The method of claim 3, wherein locating the additional digital content items comprises searching a local or a remote digital content repository of the user, and wherein relevance of additional digital content items to the information of the online meeting invite is based on a level of similarity between the eigenvector and the corresponding eigenvalue of the online meeting invite and respective eigenvectors and corresponding eigenvalues of the additional digital content items.

5. The method of claim 4, wherein the respective eigenvectors and corresponding eigenvalues of the additional digital content items are calculated upon receipt of each of the additional digital content items by the user.

6. The method of claim 1, wherein an additional digital content item is selected from the group consisting of an online meeting invite of the user, an email of the user, and a data file of the user.

7. The method of claim 1, further comprising:
sending the online meeting invite to one or more meeting invitees; and
receiving feedback from the user concerning the top-k listing of the additional digital content items.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, from an online meeting scheduler, information within an online meeting invite;
analyzing the information using natural language processing (NLP) and machine learning (ML) techniques, wherein the information comprises a meeting time;
based on results of the analysis of the received information and in response to having reached a threshold time before the meeting time, locating additional digital content items of the user which are relevant to the information of the online meeting invite;
outputting, to a user, a top-k listing of the additional digital content items for attachment to the online meeting invite before being sent;
attaching, to the online meeting invite, a digital content item selected by the user from the top-k listing, wherein the attaching augments the information of the online meeting invite; and
iteratively performing the analyzing, the locating, and the outputting until the top-k listing is the same on consecutive iterations and the user does not select any additional content items of the top-k listing for attachment.

9. The computer system of claim 8, further comprising:
outputting, to the user, a top-k listing of the additional digital content items for review prior to the meeting time of the online meeting invite.

10. The computer system of claim 8, wherein analyzing the information using NLP and ML techniques further comprises:
parsing the information as unstructured text;
applying domain specific weights to the parsed information;
performing supervised learning using the weighted parsed information; and
creating an eigenvector and a corresponding eigenvalue for the online meeting invite based on output from the performed supervised learning.

11. The computer system of claim 10, wherein locating the additional digital content items comprises searching a local or a remote digital content repository of the user, and wherein relevance of additional digital content items to the information of the online meeting invite is based on a level of similarity between the eigenvector and corresponding eigenvalue of the online meeting invite and respective eigenvectors and corresponding eigenvalues of the additional digital content items.

12. The computer system of claim 11, wherein the respective eigenvectors and corresponding eigenvalues of the additional digital content items are calculated upon receipt of each of the additional digital content items by the user.

13. The computer system of claim 8, wherein an additional digital content item is selected from the group consisting of an online meeting invite of the user, an email of the user, and a data file of the user.

14. The computer system of claim 8, further comprising:
sending the online meeting invite to one or more meeting invitees; and
receiving feedback from the user concerning the top-k listing of the additional digital content items.

15. A computer program product, the computer program product comprising:
one or more computer-readable tangible storage medium and program instructions stored on at least one of the one or more tangible storage medium, the program instructions executable by a processor capable of performing a method, the method comprising;
receiving, from an online meeting scheduler, information within an online meeting invite;
analyzing the information using natural language processing (NLP) and machine learning (ML) techniques, wherein the information comprises a meeting time;
based on results of the analysis of the received information and in response to having reached a threshold time before the meeting time, locating additional digital content items of the user which are relevant to the information of the online meeting invite;
outputting, to a user, a top-k listing of the additional digital content items for attachment to the online meeting invite before being sent;
attaching, to the online meeting invite, a digital content item selected by the user from the top-k listing, wherein the attaching augments the information of the online meeting invite; and
iteratively performing the analyzing, the locating, and the outputting until the top-k listing is the same on consecutive iterations and the user does not select any additional content items of the top-k listing for attachment.

16. The computer program product of claim 15, further comprising:
outputting, to the user, a top-k listing of the additional digital content items for review prior to the meeting time of the online meeting invite.

17. The computer program product of claim 15, wherein analyzing the information using NLP and ML techniques further comprises:
parsing the information as unstructured text;
applying domain specific weights to the parsed information;
performing supervised learning using the weighted parsed information; and
creating an eigenvector and a corresponding eigenvalue for the online meeting invite based on output from the performed supervised learning.

18. The computer program product of claim 17, wherein locating the additional digital content items comprises searching a local or a remote digital content repository of the user, and wherein relevance of additional digital content items to the information of the online meeting invite is based on a level of similarity between the eigenvector and corresponding eigenvalue of the online meeting invite and respective eigenvectors and corresponding eigenvalues of the additional digital content items.

19. The computer program product of claim 18, wherein the respective eigenvectors and corresponding eigenvalues of the additional digital content items are calculated upon receipt of each of the additional digital content items by the user.

20. The computer program product of claim 15, further comprising:
sending the online meeting invite to one or more meeting invitees; and
receiving feedback from the user concerning the top-k listing of the additional digital content items.

* * * * *